United States Patent
Angele et al.

(10) Patent No.: US 7,173,587 B2
(45) Date of Patent: Feb. 6, 2007

(54) ADDRESSING PROCESS AND DEVICE FOR A BISTABLE LIQUID CRYSTAL SCREEN

(75) Inventors: Jacques Angele, Malakoff (FR); Romain Vercelletto, Ably (FR); Thierry Elbhar, Ably (FR)

(73) Assignee: Nemoptic, Magny les Hameaux (FR)

( * ) Notice: Subject to any disclaimer, the term of this patent is extended or adjusted under 35 U.S.C. 154(b) by 387 days.

(21) Appl. No.: 10/353,244

(22) Filed: Jan. 27, 2003

(65) Prior Publication Data

US 2003/0146894 A1    Aug. 7, 2003

(30) Foreign Application Priority Data

Feb. 6, 2002    (FR)    ................................. 02 01448

(51) Int. Cl.
    *G00G 3/36*    (2006.01)
(52) U.S. Cl. .................... 345/87; 349/177; 349/186
(58) Field of Classification Search ................ 345/87, 345/94, 95, 97, 100, 99; 349/177, 186
See application file for complete search history.

(56) References Cited

U.S. PATENT DOCUMENTS

| | | | |
|---|---|---|---|
| 5,594,464 A * | 1/1997 | Tanaka et al. ................. | 345/94 |
| 5,900,852 A * | 5/1999 | Tanaka et al. ................. | 345/87 |
| 6,252,571 B1 * | 6/2001 | Nomura et al. ................ | 345/95 |
| 6,452,573 B1 * | 9/2002 | Martinot-Lagarde et al. .. | 345/8 |
| 6,784,968 B1 * | 8/2004 | Hughes et al. ............... | 349/179 |
| 2002/0084961 A1 * | 7/2002 | Acosta et al. ................. | 345/87 |

FOREIGN PATENT DOCUMENTS

FR    2740894    5/1997

OTHER PUBLICATIONS

"Write and erase mechanism of surface controlled bistable Nematic pixel", Giocondo, et al., The European Physical Journal Applied Physics, 3 pages, 1999.
Recent Improvements of Bistable Nematic Displays Switched By Anchoring Breaking (BiNem), I. Dozov, et al., SID 01 Digest 2001 SID, pp. 224-227.
"Scanning Limitations of Liquid-Crystal Displays", P. Alt, et al., IEEE Transaction on Electron Devices, vol. ED-21, No. 2, Feb. 1974, pgs 146-155.

* cited by examiner

*Primary Examiner*—Henry N. Tran
(74) *Attorney, Agent, or Firm*—Blakely Sokoloff Taylor & Zafman

(57) ABSTRACT

This invention concerns a process for addressing a bistable liquid crystal material screen, characterized in that it comprises at least the step consisting of applying, to the screen column electrodes, an electrical signal whose characteristics are adapted to reduce the mean quadratic voltage of the parasite pixel pulses, in order to reduce the parasitic addressing optical effects.

22 Claims, 14 Drawing Sheets

Variant 1 of the invention

Reduction in the application time of the column signal:

Obtaining switching signals with 3 plateaux

Pixel switching signals

Write signals: switch to the T twisted texture

Erase signals: switch to the U uniform texture

Slow drop by slope.

Figure 2b1

Slow stepped drop.
Two plateaux

Figure 2b2

Write or erase depending on the value of the second plateau to the pixel terminals corresponding to the electro-optical curve of Signals made symmetrical by changing of polarity at each image Symmetrical signals with constant polarity and reduced excursion

Fig 9a — Line N

Line N + 1

Column M

Pixel M,N
erase

Pixel M,N + 1
write

The 5 levels of the line signal are:   0 ; (P2I-P2E)/2 ; (P2I+P2E)/2 ; P2I; P1.

The 5 levels of the column signal are:   0 ; (P2I-P2E) ; P2E ; P2I; P1.

The pixel voltages are:   0 ; ±(P2I-P2E)/2 ; ±P2E ; ±P2I ; ±P1.

The means of the square of the parasite signal is: $\tau_2( P2I-P2E)^2/4(\tau_1+\tau_2)$.

Dot matrix screen diagram (reminder)

Existence of parasite signals at the terminals of a pixel

Variant 1 of the invention

Reduction in the application time of the column signal:

Obtaining switching signals with 3 plateaux

Variant 2 of the invention

Exemple 1

Reduction in the application time of the column signal and modification of its form so as to reduce its surface with respect to the tooth form
Slope shaped column signal

Variant 2 of the invention

Exemple 2

Reduction in the application time of the column signal and modification
of its form so as to reduce its surface with respect to the tooth form
Double plateau shaped column signal Disruption of the optical transmission of a pixel during addressing of the image by parasite column signals

PRIOR ART

Figure 14a

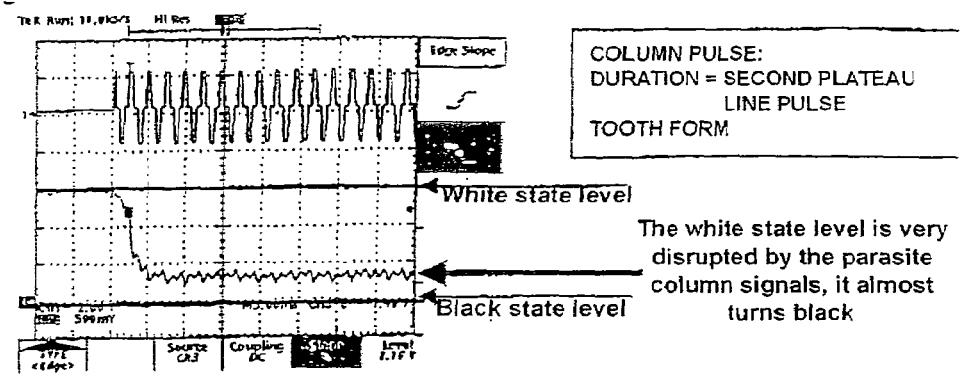

COLUMN PULSE:
DURATION = SECOND PLATEAU LINE PULSE
TOOTH FORM

The white state level is very disrupted by the parasite column signals, it almost turns black

Figure 14b

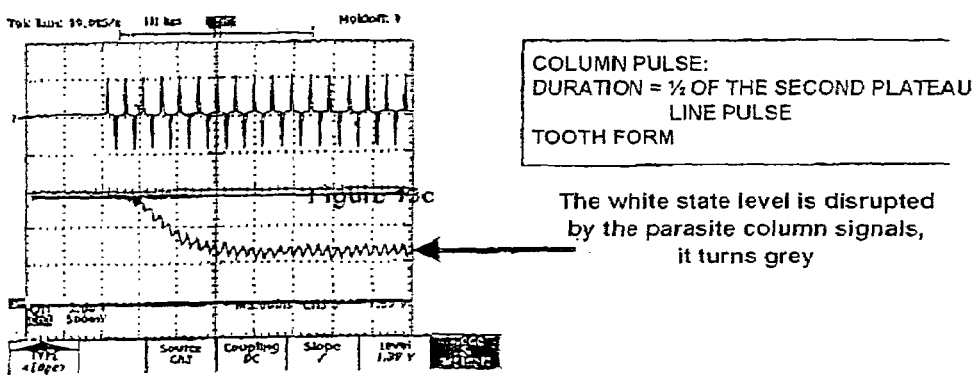

COLUMN PULSE:
DURATION = ½ OF THE SECOND PLATEAU LINE PULSE
TOOTH FORM

The white state level is disrupted by the parasite column signals, it turns grey

Figure 14c

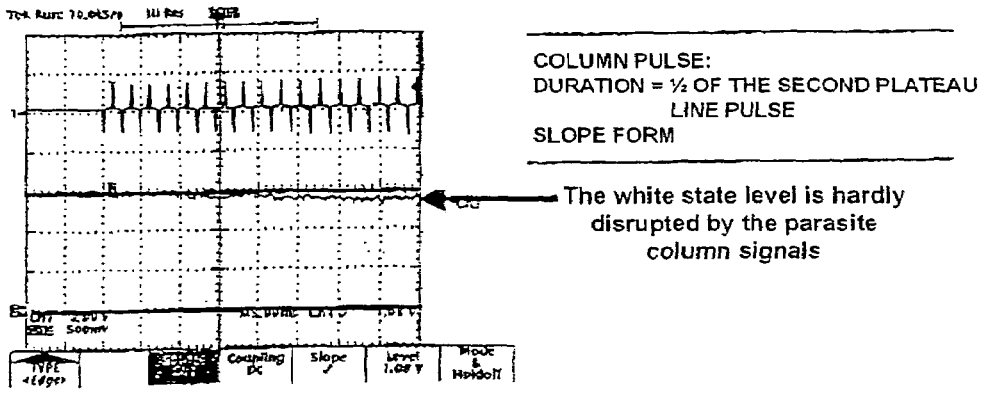

COLUMN PULSE:
DURATION = ½ OF THE SECOND PLATEAU LINE PULSE
SLOPE FORM

The white state level is hardly disrupted by the parasite column signals

Figure 14

ADDRESSING PROCESS AND DEVICE FOR A BISTABLE LIQUID CRYSTAL SCREEN

FIELD OF THE INVENTION

This invention concerns the field of liquid crystal display devices and more specifically a process and device for controlling the switching between two states of a multiplexed bistable nematic display unit.

DESCRIPTION OF THE RELATED ART

The purpose of the invention is to optimise the electronic line and column addressing signals of a multiplexed bistable display unit in order to eliminate visual disruption of an image that has already been memorised, when addressing the screen to display a new image.

According to the physical nature of the liquid crystal used, nematic, cholesteric, smectic, ferro-electric, etc. devices can be distinguished. In the nematic display units, which are the subject of this invention, a nematic, achiral or chiralised element is used for example, using a chiral doping agent. In this way, a spontaneously uniform or slightly twisted texture is obtained, whose thread pitch is slightly bigger than a few micrometers. The orientation and anchoring of the liquid crystal close to the surfaces are defined by layers or alignment treatments applied to the substrates. In the absence of a field, in this way a uniform or slightly twisted nematic texture is imposed.

Most of the devices proposed and manufactured to date are monostable. In the absence of a field, a single texture s created in the device; this corresponds to an absolute minimum of the total cell energy. In a field, this texture is continuously deformed and its optical properties vary according to the voltage applied. When the field is cut, the nematic once again returns to the single monostable texture. Those skilled in the art will recognise from these systems the most common operating modes of nematic display units: twisted nematics (TN), super-twisted nematics (STN), electrically controlled birefringent (ECB), vertically aligned nematics, etc.

Another class of nematic display units is that of bistable, multistable or metastable nematics. In this case, at least two distinct textures can be created in the cell, with the same anchoring on the surface and stable or metastable in the absence of a field. To switch between the two states, suitable electric signals are applied. Once the image has been registered, it remains in memory in the absence of the field thanks to its bistability. This memory of bistable display units is very interesting for many applications. On the one hand, it makes possible a very low image refresh rate, which helps considerably in lowering the consumption of portable devices. On the other hand, for rapid applications (e.g. video), the memory guarantees a very high rate of multiplexing, making high-resolution video possible.

Description of the Bistable Screen Called BiNem (FIG. 1)

Recently, a new bistable display unit (document 1) has been proposed.

It is formed of a layer of chiralised or cholerestic nematic liquid crystal between two blades or substrates, of which at least one is transparent. Two electrodes respectively positioned on the substrates allow electrical command signals to be applied to the chiralised nematic liquid crystal situated between them. On the electrodes anchoring layers direct the liquid crystal molecules to the desired directions. On a master blade, the molecule anchoring is strong and slightly angled, on the slave blade it is low and flat. The anchoring of the molecules on these surfaces is monostable.

An optical system completes the device.

At the liquid crystal layer level, two textures, U (uniform or slightly twisted) and T are stable in the absence of a field. The uniform texture may be slightly twisted to favour the device's optics. This is obtained by an angle between the direction of the anchoring on the master blade and on the slave blade. The two textures are 180° different and are topologically incompatible. The spontaneous pitch $p_o$ of the nematic is selected at almost 4 times the thickness D of the cell ($p_o \cong 4d$) in order to make the energies of u and T essentially equal. Without a field, there is no other state with a lower energy: U and T have a true bistability.

Changing from One Texture to Another by Breaking the Anchoring

Physical Principal

The two bistable textures are topologically distinct, it is impossible to transform one into the other by continuous volume distortion. The transformation of a U texture into a T texture or vice versa therefore requires rupture of the anchoring on the surfaces, induced by a strong external field, or by moving one of the lines of disinclination. This second phenomenon, which is much slower than the first, can be neglected and will not be detailed herein.

Any alignment layer of a liquid crystal can be characterised by a zenithal anchoring energy $A_z$. This energy is always finite. It can then be shown that there is a field threshold $E_C$ that is also finite (anchoring break threshold), that gives the surface, regardless of the previous texture in the absence of the field, a homeotropic texture (H).

The breakage of the anchoring requires a field to be applied at least equal to the field threshold $E_C$. This field must be applied long enough so that the re-orientation of the liquid crystal close to the surface ends in the homeotropic texture. This minimum time depends on the amplitude of the field applied, as well as the physical characteristics of the liquid crystal and the alignment layer. In the static case (field applied for a few milliseconds or more), $E_C = A_z / \sqrt{K_{33} \epsilon O \Delta \epsilon}$, where $A_z$ is the zenithal anchoring energy, $K_{33}$ the elastic twisting coefficient of the liquid crystal, $\Delta \epsilon$ its relative dielectric anisotropy and $\epsilon o$ the dielectric constant of the vacuum.

$V_c$, the anchoring breakage voltage is defined as follows: $V_c = E_C \cdot d$, where d is the thickness of the liquid crystal cell.

The anchoring is considered to be broken when the molecules are perpendicular to the blade next to this surface, and when the return tension exerted by the surface on these molecules is nil. In practice, it is enough for the difference between the orientation of the molecules and the perpendicular at the surface to be sufficiently small, for example less than 0.5°, and that the tension that is applied to the molecules at the surface is fairly low. When these conditions are satisfied, the nematic molecules close to the broken surface are in an unstable equilibrium when the electrical field is cut off, and may either return to their initial orientation, or turn in the opposite direction and induce a new texture, different from the initial texture by a twist of 180°.

The control of the final texture depends on the form of the electrical signal applied, and in particular the way in which this field is brought to zero.

Progressively lowering the pulse voltage minimises the flow, the molecules close to the master blade drop slowly down to their state of equilibrium, their elastic coupling with the molecules of the centre of the sample also makes them turn in the same direction, this movement spreads to the slave blade where the molecules turn rapidly in turn in the same direction, helped by the surface tension. The uniform state U is progressively built in the centre of the cell.

When the field drops sharply, the orientation of the liquid crystal is changed, first close to the strong surface (master blade), with a surface relax time equal to $\gamma_1 L^2/K$, where $L=K_{33}/A_z$ is the length of the extrapolation of the strong layer, and $\gamma_1$ the rotation viscosity of the liquid crystal. This time is typically around a tenth of a micro-second.

The switching of the strong surface in such a short space of time induces high flow close to this surface, which spreads throughout the volume and reaches the weak surface (slave blade) after a characteristic time of less than a micro-second. The shearing force induced on the weak surface (slave blade) creates a hydrodynamic force on the molecules of this surface. This force is in the opposite direction to the elastic force induced by the angle of the master blade. When the shear force is strong enough, the hydrodynamic force on the weak surface is stronger, it favours the twisted texture T. When the shear force is weaker, the elastic force on the weak surface is weaker and it induces the uniform texture U.

The direction of rotation of the molecules in the cell is indicated by an arrow on FIG. 1.

The volume is then re-orientated, with a characteristic relax time $t_{vol}$ equal to $\gamma_1 d^2/K$, where d is the thickness of the cell. This time is significantly greater than the relax time of the strong surface, typically around one millisecond.

Practical Implementation

Taking account of the effect explained above, it is the way in which the electrical pulse applied to the terminals of each pixel is lowered that conditions the change from one texture to the other.

We will randomly call the change to the twisted texture T "write" and the change to the uniform texture U "erase".

To obtain "write" on a pixel, and thus the change to texture T, the following is necessary:

1) A pulse must be applied to it, providing a field greater than the anchoring breakage field of the slave blade and then wait the time required for the pixels in the molecule to change. The breakage field depends on the elastic and electrical properties of the liquid crystal material and its interaction with the anchoring layer deposited on the slave blade of the cell. It is around a couple of volts to about ten volts per micron. The time for the molecules to change is proportional to the rotational viscosity, $\gamma$, and inversely proportional to the dielectrical anisotropy of the material used and the square of the field applied. In practice, this time can be as low as a few micro-seconds for fields of 20 volts per micron.

2) The field must then be reduced quickly, by creating within a few micro-seconds, or at most a few dozen micro-seconds, a swift drop in the control voltage. This swift drop in voltage, of amplitude $\Delta V$, is such that it is capable of inducing, in the liquid crystal, a sufficiently intense hydrodynamic effect. To produce the T texture, this drop must imperatively make the voltage applied change from a voltage greater than the breakage voltage $V_c$, to a value that is smaller than it. The time for the applied field to drop is less than one tenth of its duration or 50 micro-seconds in the case of long pulses. FIGS. 2a1 and 2ab show two examples of a pulse that induces the T texture.

In FIG. 2a1, the pulse includes a first sequence of a duration $\tau_1$, of an amplitude P1 such that P1>$V_C$ followed by a second sequence of a duration $\tau_2$, and an amplitude P2 slightly smaller than P1 such that P2>$V_C$ and P2>$\Delta V$, the said second sequence dropping swiftly to zero. In FIG. 2a2, the pulse includes a first sequence of a duration $\tau_1$, of an amplitude P1>$V_C$ followed by a second sequence of a duration $\tau_2$, and an amplitude P2 such that P2<$V_C$ and: P1−P2>$\Delta V$.

To "erase", the following is required:

1) The molecules must also be changed

2) A "slow drop" must be carried out. Document (1) shows two embodiments of this "slow drop", shown diagrammatically in FIGS. 2b1 and 2b2: the "erase" is either a pulse of duration $\tau_1$, and amplitude P1 followed by a slope of duration $\tau_2$ whose drop time is three times greater than the duration of the pulse (FIG. 2b1), or a stepped drop, in the form of a signal with two plateaux (first sequence of duration $\tau_1$ and amplitude P1, followed by a second sequence of duration $\tau_2$ and amplitude P2 such that either P2>$V_C$ and P2<$\Delta V$, or P2<$V_C$ and P1−P2<$\Delta V$. As the stepped drop is easier to carry out with digital electronic equipment, so we will not discuss the slope drop here. However, we can imagine a drop with more than two plateaux.

The characteristic pulse forms for the change from one texture to another are given in FIG. 2 (see document 1) and document (2). The duration and values of the plateaux (P1, $\tau_1$) and (P2,$\tau_2$) have been determined experimentally in the examples given below.

Classic Multiplexing Principle

In the case of an average resolution dot matrix screen, those skilled in the art know that it is out of the question to connect individually every pixel to an independent control electrode, as this would require a connection for very pixel which is topologically impossible as soon as the screen becomes complex. It is possible to save connections by using the multiplexing technique when the electro-optical effect used is not linear, which is the case for usual liquid crystal technologies. The pixels are grouped using a dot matrix system into n groups of m pixels each. There are for example n lines and m columns for the dot based screens or n figures and m parts of figures for digital displays. In the sequential addressing mode, which is the most widely used, one line is selected at a time, then the following line and so on until the last line is reached. During the time required to select a line, the column signals are applied at the same time to all of the pixels of the line. This method allows an image to be addressed in a total time equal to the addressing time of a line multiplied by the number of lines n. With this method, m+n connections are required to address a screen of m×n pixels, where m is the number of columns of the matrix in question. A multiplexed dot display screen is illustrated in FIG. 3.

The electrical signal seen by the pixel is the difference between the signal applied to the line and the signal applied to the column of which the pixel is the intersection.

This principle of screen, shown in FIG. 2, is called a "passive screen". It does not have any active elements allowing it to isolate the pixels. A line electrode is common to all of the pixels of the line, and a column electrode is common to all of the pixels of the column, with no active element (e.g. a transistor) . The passive screens are consequently easier to manufacture than active screens that have a transistor or a control diode per pixel.

The drawback with passive multiplexing is that a pixel is sensitive to the column signals throughout the time that the image is addressed, and not just when its line is activated. This means that a screen pixel successively receives, during the image write time, the column signals from its entire column. We can consider that the signals applied to the pixel outside of the time its line is selected as parasite signals, which interfere in the electro-optical response of the liquid crystal pixel. More precisely, for passive dot matrices, such as TN or STN or one of their variants, the state of the liquid crystal in a pixel is almost solely dependent on the mean quadratic value of the voltage that is applied to it during the time that the image is addressed, in normal operating conditions. Therefore the final state of the liquid crystal molecules, which is to say the optical transmission of the pixel, is determined by the rms value of the voltage applied during the time that the image is addressed. The consequence is the limiting of the number of lines of the screen expressed by the criterion of Alt and Plesko (document 3).

Multiplexing Principle Applied to the Binem

The BiNem screens considered are also formed by n×m pixels (FIG. 3), carried out at the intersections of perpendicular conductive strips on the two substrates already mentioned. The pixel of line N+1, column M is shown in black. The device is completed by connections and circuits placed on the substrate or on auxiliary boards.

The write and erase signals applied to the pixels are created by the combination of line and column signals. They permit writing and erasing to be performed line by line, and thus rapidly of the screens in question.

Signals must be applied to the lines and columns such that the resulting voltage at the terminals of the pixel are of the type described in FIG. 2: the voltage applied to the pixel during the line write time must be equal to the pulse, which, upon demand, either stops swiftly causing a voltage drop greater than or equal to ΔV and creates the T twisted texture (usually an optically black state), or drops progressively by plateaux and creates the U uniform texture (usually an optically shiny state).

The possibility of changing between the U and T textures and reciprocally by multiplexing, is shown by the electro-optical curve shown in FIG. 4: the BiNem pixel is addressed with a double plateau pulse of value P1 fixed and P2 variable. The optical transmission is given according to the value of the second plateau P2 where P1=16 V. The pulse times are 0.8 ms. Taking account of the orientation of the polarisers in this example, a minimum transmission corresponds to the T state and a maximum to the U state.

Write Zones

For P2 voltages higher than about 11 Volts, the voltage drop at the end of plateau 2 is sufficient to write. For P2 voltages lower than 5V, the voltage drop at the end of $\tau_1$ has written, the voltage of plateau 2 is lower than $V_C$, the voltage drop at the end of it can no longer generate the texture change.

The voltage drop value ΔV required to write is equal to approximately 6V and the break voltage $V_C$ approximately 5V.

Erase Zone

It can be seen on the curve in FIG. 4 that erase occurs for a P2E voltage of between 6 and 9 Volts. In this voltage range, at the end of time $\tau_1$, the molecules close to the slave blade are driven by the flow and therefore in the write direction. During plateau 2, slightly higher than the breakage voltage, they almost return to the vertical position but are slightly angled towards the erase direction due to the elastic coupling with the master blade. At the end of time $\tau_2$, the voltage drop, which is less than ΔV, is too small for the second flow to straighten the molecules, to make them turn into its direction and thus write. The slow drop is therefore carried out in two steps.

The values of the second plateau corresponding to one or the other of the textures are shown in FIG. 5.

Multiplexing the BiNem According to the Prior Art

F1 and F2 are defined as the two operating points located at the point of inflection where the optical transmission curve rises or falls shown in FIG. 4. Let us consider F2 by way of example. The voltage corresponding to point F2, equal to 11V, may correspond to the value of the second plateau A2 of the line signal. The value of the column voltage C=2V corresponds to the voltage interval required to obtain the pixel voltage either corresponding to the T texture (minimum transmission) or the U texture (maximum transmission). The value of the second plateau applied to the pixel is therefore P2I=A2+C for write (U texture) or P2E=A2−C for erase, where:

for the line signal: A1=16V A2=10 V for the column signal: C=2V for the pixel terminal signal: P1=16V, P2E=8V, P2I=12V.

These values vary according to the properties of the liquid crystal and the alignment layer, and can easily be adjusted for other screens produced using the same principle with different materials. An example of this is detailed in document (4).

FIG. 6 shows the principle of line and column signals carrying out the write and erase functions, when the selection is on the operating point F2 as described above. The line signal (FIG. 6a) has two plateaux: the first provides the A1 voltage during $\tau_1$, the second A2 during $\tau_2$. The column signal (FIGS. 6b and 6c) of amplitude C is only applied during the time $\tau_2$, positively or negatively according on whether writing or erasing is to be carried out. The time $\tau_3$ separates two line pulses. FIGS. 6d and 6e show the signals applied respectively to the terminals of an erased pixel and to the terminals of a written pixel. These signals are very simple and permit easy adjustment of all their parameters to suit the characteristics of the screen.

Multiplexing Variants—Obtaining a Nil Mean Value

In order to take account of the problems of damage due to electrolysis of certain liquid crystal materials subjected to a constant voltage, it is often useful to apply signals to the pixels with a nil mean value. FIGS. 7, 8 and 9 show techniques that permit the principle signals of FIG. 6 to be transformed into symmetrical signals with a nil mean value.

In FIG. 7, two identical signals with opposite polarities that follow one another form the line selection signal. FIGS. 7a, 7b, 7c, 7d and 7e respectively represent the line signals, the column erase signals, the column write signals, the erase signals at the terminals of a pixel. Another symmetrisation technique is proposed in FIG. 8. The signals are the same as that on FIG. 5. However, their signs are inverted at each change of image.

The line signal driver must, in the previous cases and due to the symmetrisation, supply a voltage of +/−A1 which is to say a total excursion of 2.A1. A notable simplification of the divers can be obtained if the maximum excursion is reduced to a value below 2.A1. To do this, it suffices to change synchronously the mid operating point Vm of the line signal and the corresponding column signal at the second polarity. If we take case 7, this implies adding a common voltage, Vm to all of the line and column signals during the symmetrisation phase. FIG. 9 shows the example of a signal Vm=0 during the first polarity and Vm different from 0 during the second polarity. This principle is applicable with Vm, different from zero during the first polarity and then Vm different from zero during the second polarity. The important point is that the voltage at the terminals of the pixel remains unchanged, as described in FIG. 7. Once again, FIGS. 9a, 9b, 9c, 9d and 9e respectively show the line signals, erase column signals, write column signals, erase signals to the terminals of a pixel and write signals to the terminals of a pixel.

Limits of the Classic Method of Multiplexing the BiNem

The classic method of multiplexing the BiNem can limit the optical performances of the images displayed. In fact, the pixel signal is composed of two contributions: the signal resulting from the line and column signals during the period in which its line is selected, plus parasite signals that correspond to the column signals applied to the pixel outside of the period in which its line is selected. FIG. 10 shows the existence of these parasite signals.

FIGS. 10a, 10b, 10c, 10d and 10e respectively show the line signals, erase column signals, write column signals, erase signals to the terminals of a pixel and write signals to the terminals of a pixel. FIG. 10f shows a dot matrix screen.

In practice, the amplitude of the column signals is much lower than the anchoring breakage threshold. The parasite signals cannot in any case cause the textures to change. Nevertheless, they cause temporary disruptions to the optical response by deforming the texture of the pixel without breaking either the strong or weak anchoring. The optical appearance may be severely disrupted during the total duration of the addressing of the screen. This may cause for example dither, a loss of image contrast, etc. After all of the image has been written, the parasite voltages disappear and the pixels return to their initial, stable texture until the next addressing cycle.

If the total time required to address the image is short, the dither of the image is not easy to see by the observer.

However, for larger screens where the image write time is longer, it is better to eliminate these temporary disruptions. It is preferable that an image replaces the other progressively line by line, without disrupting the other lines. In order to do this, the mean quadratic voltage of the parasite signals Vrms must be lower than the Fréedericks threshold voltage $V_F$, because then the elasticity of the liquid crystal is sufficient to fight the disrupting field. Therefore, to avoid disruptions during the change of image, the following is necessary:

$$Vrms < VF \quad (1)$$

Or $$[\tau2/(\tau1+\tau2+\tau3)]C^2 < V^2_F \quad (2)$$

The above formula takes into account the integration time the duration $\tau1+\tau2+\tau3$, equal to the time between two successive column signals. This calculation hypothesis is only correct if:

$$\tau1+\tau2+\tau3 < \tau_{CL} \quad (3)$$

where $\tau_{CL}$ is the characteristic response time of the liquid crystal for column pulses of amplitude C. In fact, if the time between two successive column signals is greater than the response time of the liquid crystal, then the integration time to be taken into consideration is the shortest, i.e. equal to the response time of the liquid crystal. The criterion to be respected is in this case more severe. We will then look to position it at $\tau1+\tau2+\tau3 < \tau_{CL}$.

To respect the equation (2), a first method is to minimise C. The lower limit of C is imposed by the electro-optical response curve shown in FIG. 4. Too low of a value for C will not allow the change to be made between two textures.

When the minimisation of C is insufficient for condition 2 to be satisfied, the relationship $\tau2/(\tau1+\tau2+\tau3)$ must be reduced.

For example, it is possible to provide an additional time $\tau3$ positioned between the pulses of the different lines to reduce further the mean quadratic value of the parasite voltages. This method unfortunately increases the image write time,. Furthermore, if the inequality (3) is not respected, this option is not effective.

Here is a numerical calculation by way of example:

For the liquid crystal materials used in these devices, the Fréedericks threshold voltage $V_F$ varies from 0.65 to 1.5 Volts. Let us consider the most unfavourable case of 0.65 V Where $\tau1=\tau2=500$ µs and $\tau3=0$ and a signal C=2 V we have:

$$Vrms2 = \tau2/(\tau1+\tau2)C^2 = C^2/2 = 2V^2$$

$$Vrms = 1.4V > 0.65V$$

Criterion 1 is not respected.

The characteristic response time of the liquid crystal is given by the formula:

$$\tau_{CL} = (\gamma d^2/K\pi^2)/[(V/V_F)^2 - 1]$$

where $\gamma$ is the rotational viscosity and k the elastic constant of the liquid crystal. Typically, $\gamma = 80 \cdot 10^{-3}$ Pa 5 and $K = 7 \cdot 10^{-12}$ N. d is the thickness of the cell typically 1.5 *m and V the C column voltage typically 2 V.

We calculate that $\tau_{CL} = 1$ ms. The inequality (3) is respected but only just; there is no margin to increase $\tau3$ as then it would be necessary to calculate Vrms in a shorter space of time.

In these conditions, typical of the BiNem display unit, there will therefore be dither when the image is addressed.

BRIEF SUMMARY OF THE INVENTION

The inventors propose a new process to eliminate the dither effect. It involves modifying the column signal so as to reduce the Vrms value with respect to the classic case, while continuing to synchronise its drop with that of the line pulse.

The addressing process of a bistable nematic anchoring breakage liquid crystal dot matrix screen, according to this invention, is characterised by the fact that that it comprises at least the step consisting of applying, to the electrodes of the screen column, an electrical signal whose parameters are adapted to reduce the mean quadratic voltage of the parasite pixel pulses to a value lower than the Fréederickzs voltage, in order to reduce the parasitic optical effects of addressing.

Two variants are proposed to achieve this result. The first variant consists of reducing the time $\tau_C$ during which the column signal is applied, this time becoming less than to the time $\tau_2$ of the duration of the second plateau of the line signal.

The second variant proposed consists of changing the form of the column signal so that the effective voltage is reduced. These two variants will be detailed in the following description, which is in no way restrictive.

This invention also proposes a dot matrix screen addressing device.

Two operating points compatible with multiplexed addressing can be noted.

Figure 1:
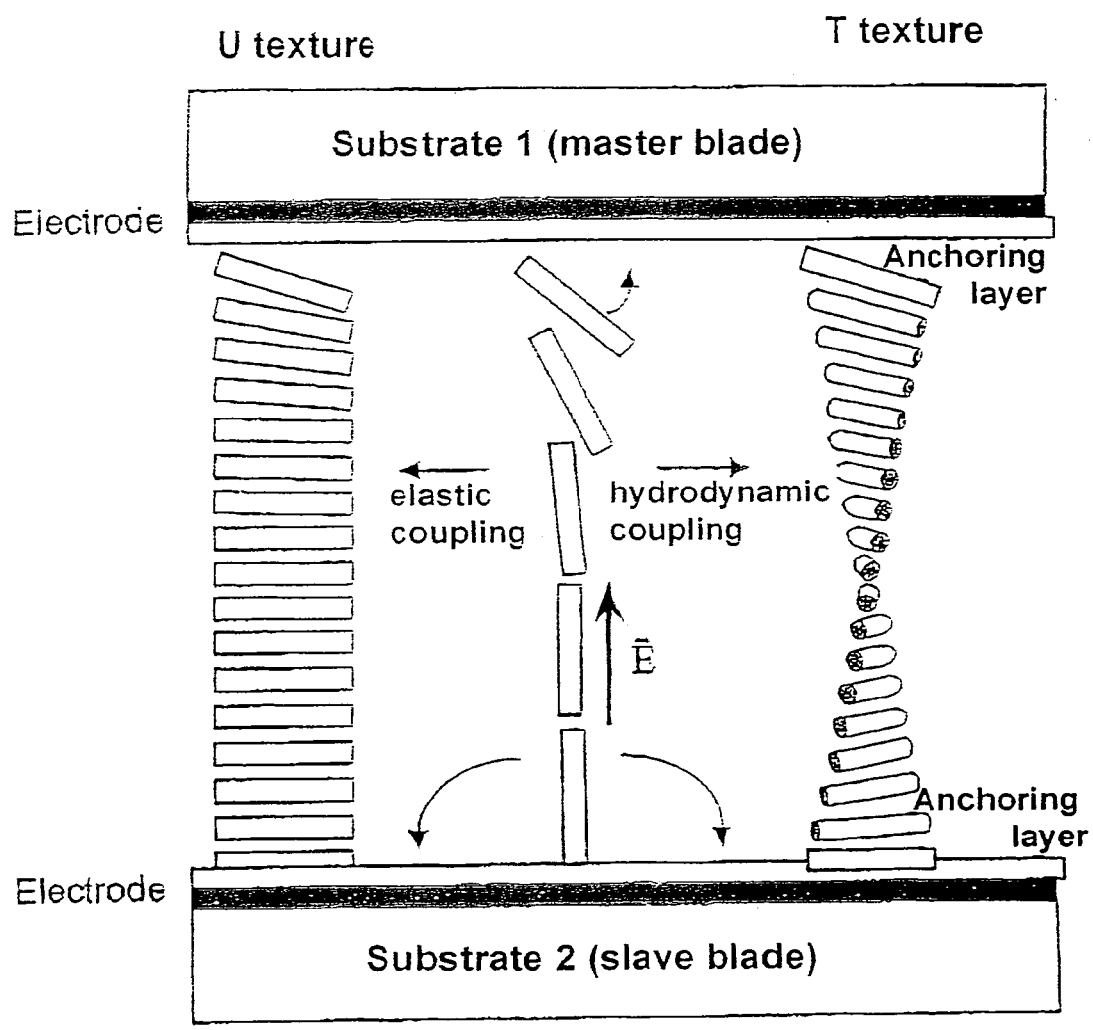
FIG. 1 shows diagrammatically the state of the technique and more precisely a pixel of the liquid crystal cell and, in this pixel, the two stable textures without the applied molecule field: (called U uniform texture and T twisted texture). The diagram H shows the texture of the molecules in the field. The arrows indicate the rotation of the molecules when the field is stopped.
Figure 2:
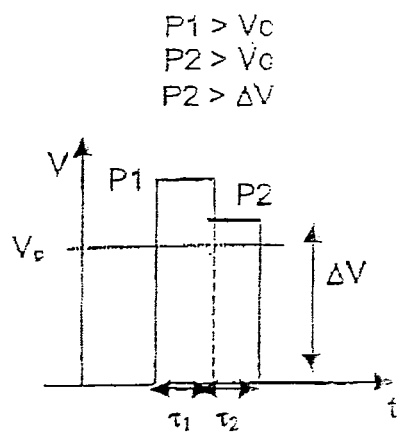
FIG. 2 shows the classic pixel signals allowing the switch between the two textures. The time for the write signal to drop is less than one tenth of its duration or less than 50 micro seconds in the case of long pulses. Two erase signals are proposed: one is a pulse followed by a slope whose drop time is greater than three times the duration of the pulse, the other is a stepped drop, a signal with two plateaux.
Figure 2:
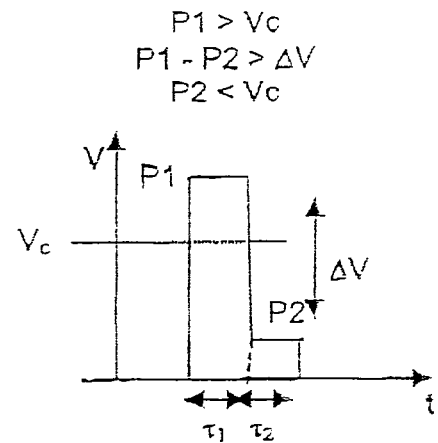
Figure 2:
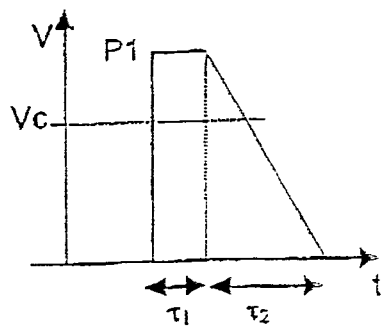
Figure 2:
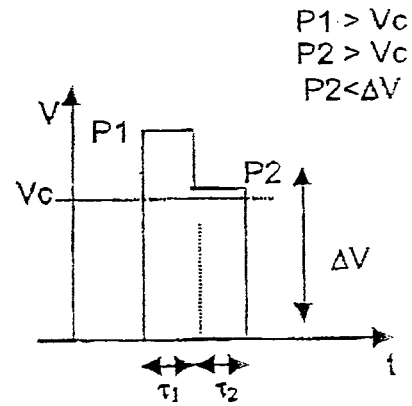
Figure 3:
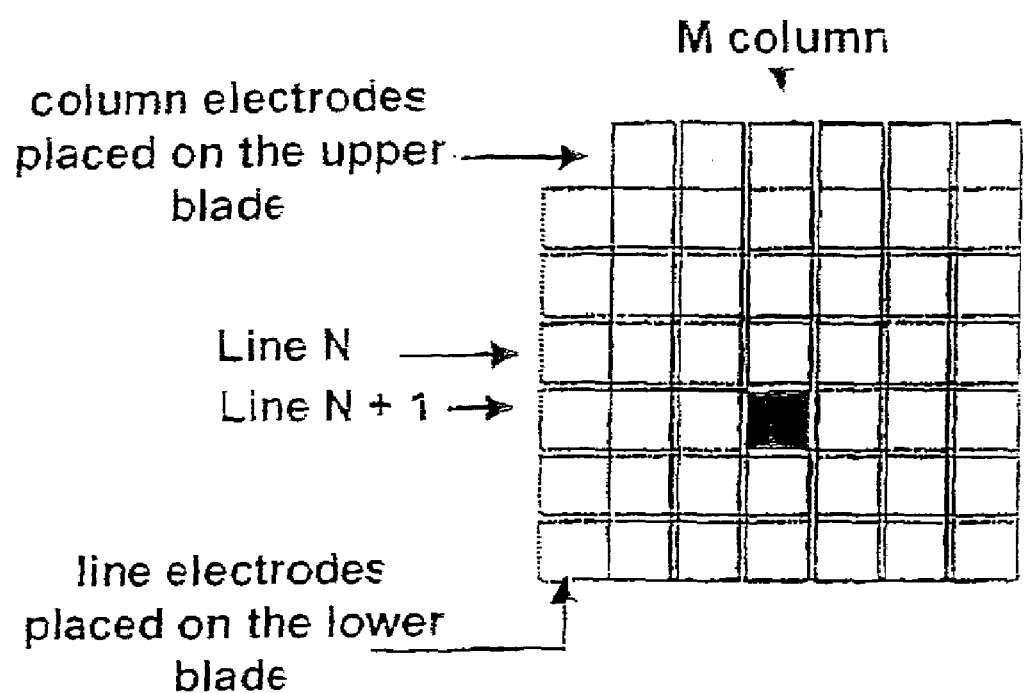
FIG. 3 shows the principle of a classic multiplexed dot matrix screen. The active zone of a pixel is situated at the intersection of the column and line electrodes. When the line N is addressed, the column signals are applied simultaneously to all of the columns, then it moves the following line.
Figure 4:
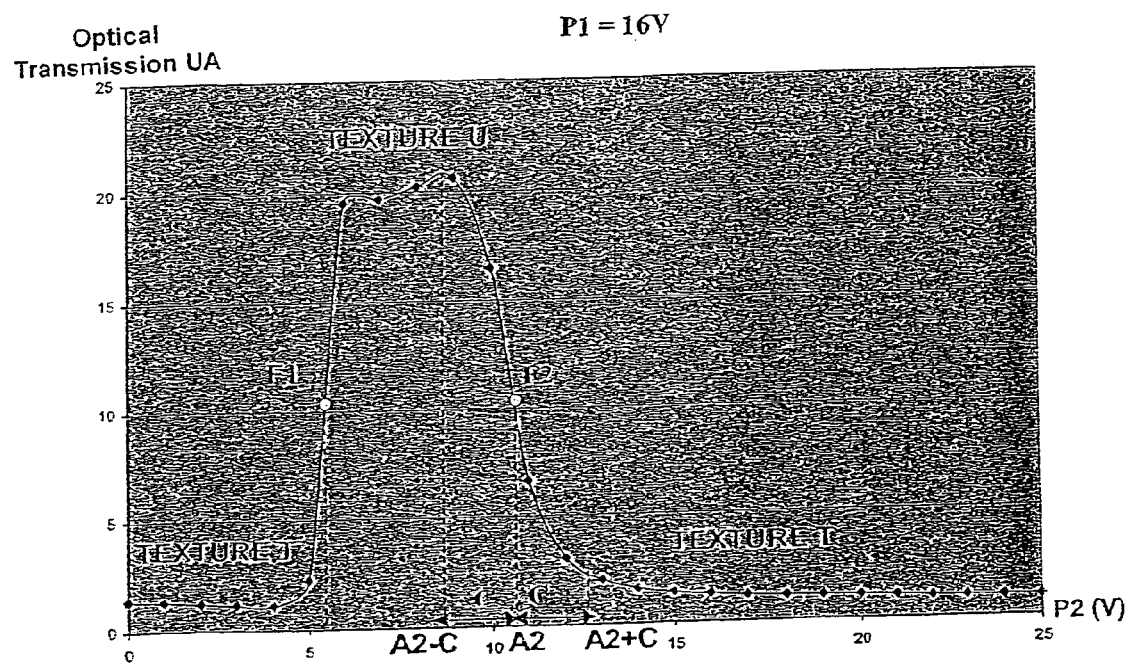
FIG. 4 provides an example of an electro-optical curve of a liquid crystal pixel operating according to the classic principle of FIG. 1. The first plateau of the applied voltage is equal to 16 V, and the optical transmission depends on the value of the second plateau.
Figures 4, 5:
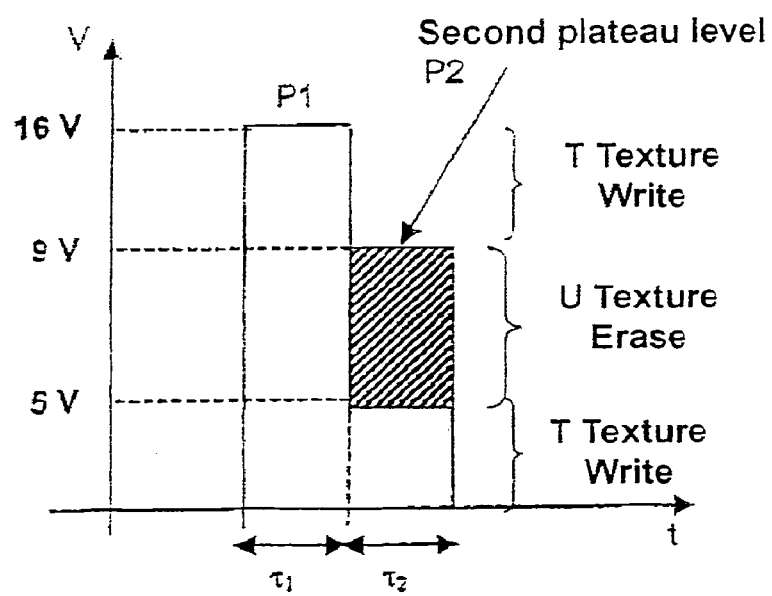

FIG. 5 details the correspondence between the value of the second plateau and the texture obtained in a classic device. In the example of FIG. 4, the U uniform texture is obtained for a second plateau value of between 5V and 9V. For a second plateau value of between 0 and 5V or between 9 V and 16V, the T twisted texture is obtained.

Figure 6:
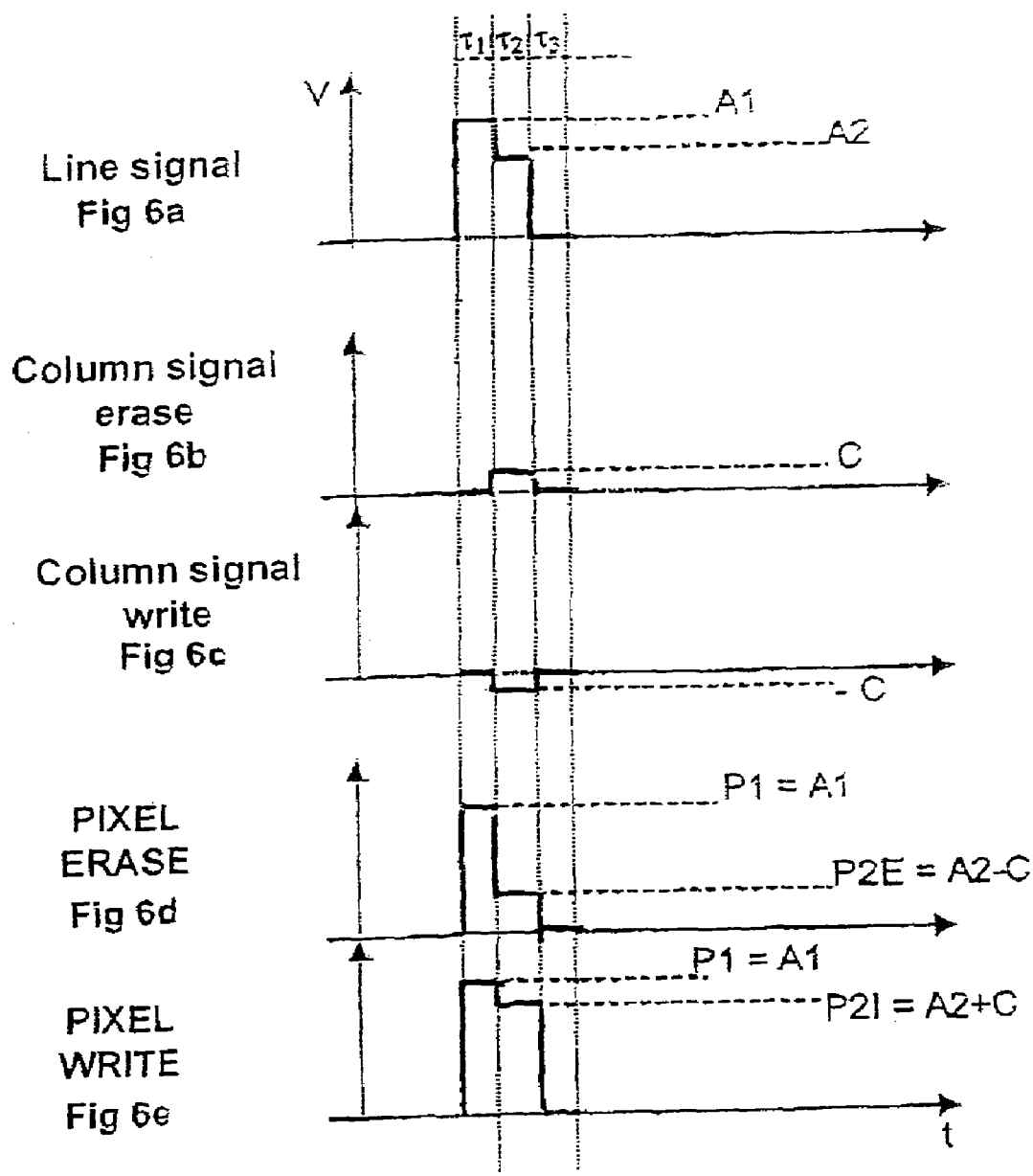

FIG. 6 illustrates the line and column signals of classic multiplexed addressing: either one or the other of the two textures is obtained depending on the column signal sign.

Figure 7:
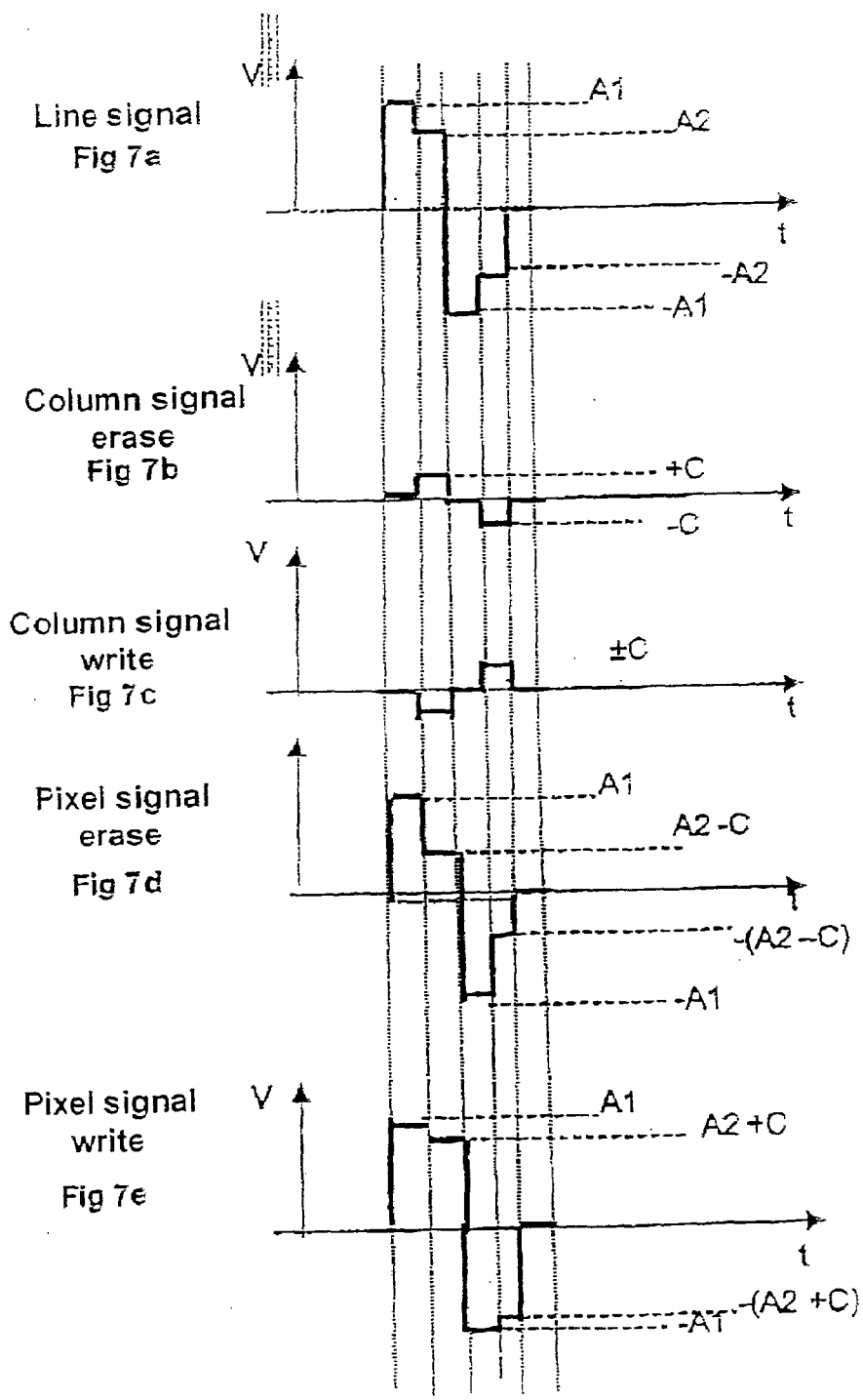

FIG. 7 shows a classic improvement proposed to avoid polarisation of the liquid crystal cell which could lead to slow damage of the material by electrolysis. The line and column signals are symmetrised, their mean value is hence nil.

Figure 8:
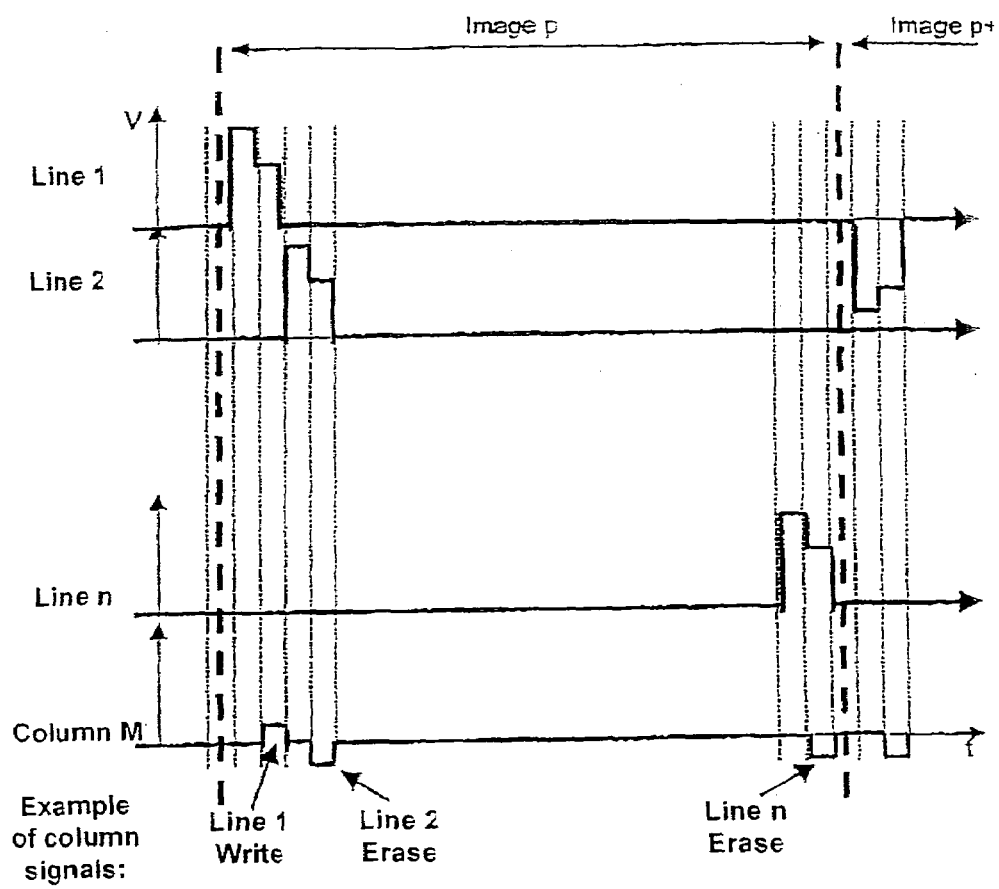

FIG. 8 presents another classic version where the symmetry is obtained by inverting the polarity from one image to the other.

Figures 9, 9B, 9C, 9D, 9E:
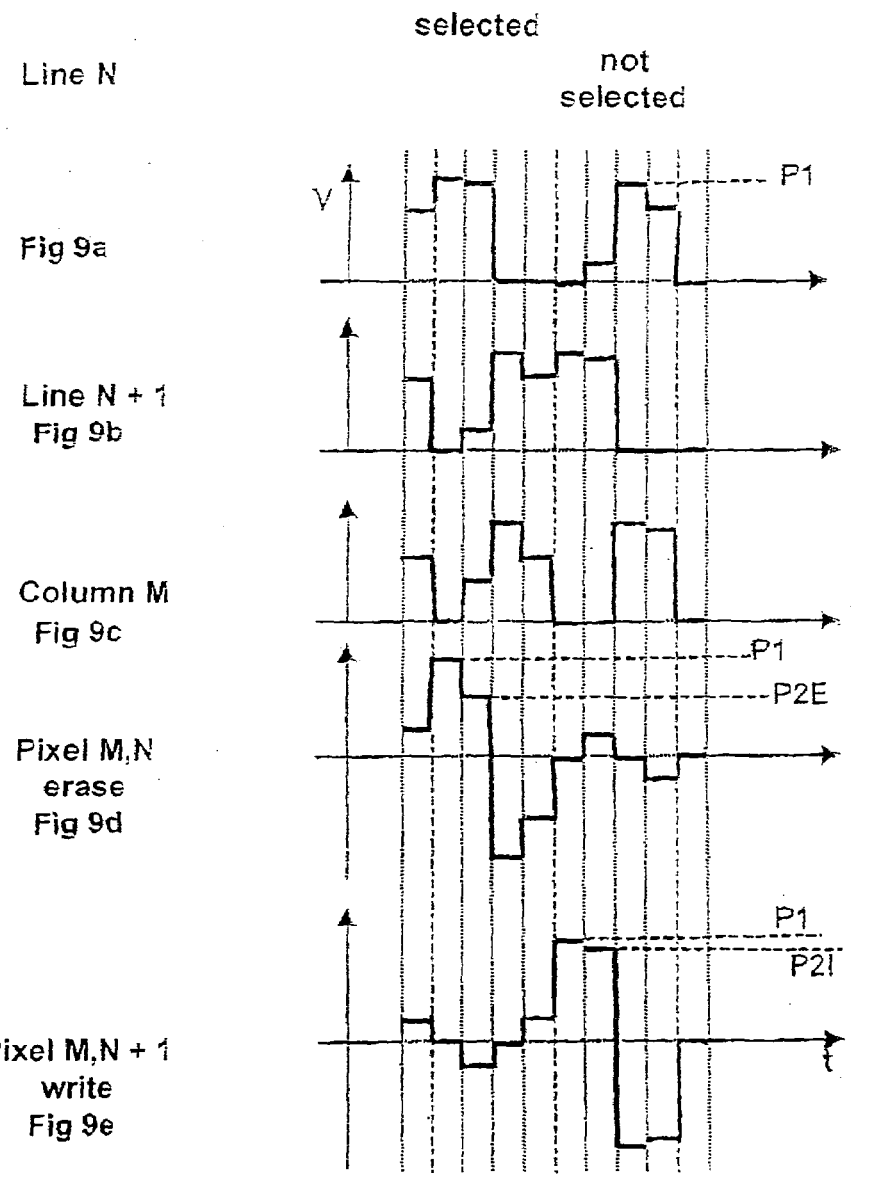

FIG. 9 presents the signals that allow symmetrical signals to be applied to the pixels, while minimising the control circuit voltage excursion. In this case, the lines not selected receive a line signal equal to the means of the column signals instead of not receiving a signal, as in the previous cases.

Figure 10:
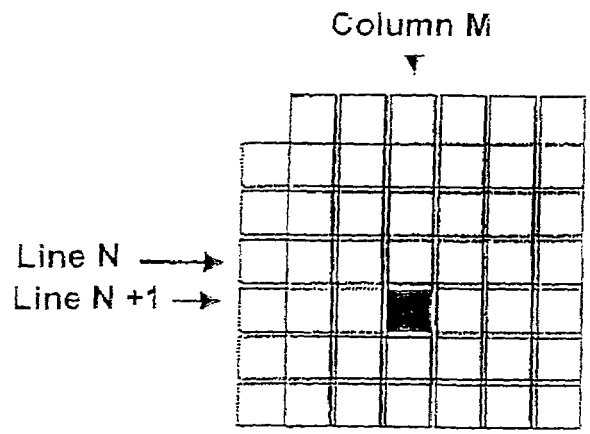
Figure 10:
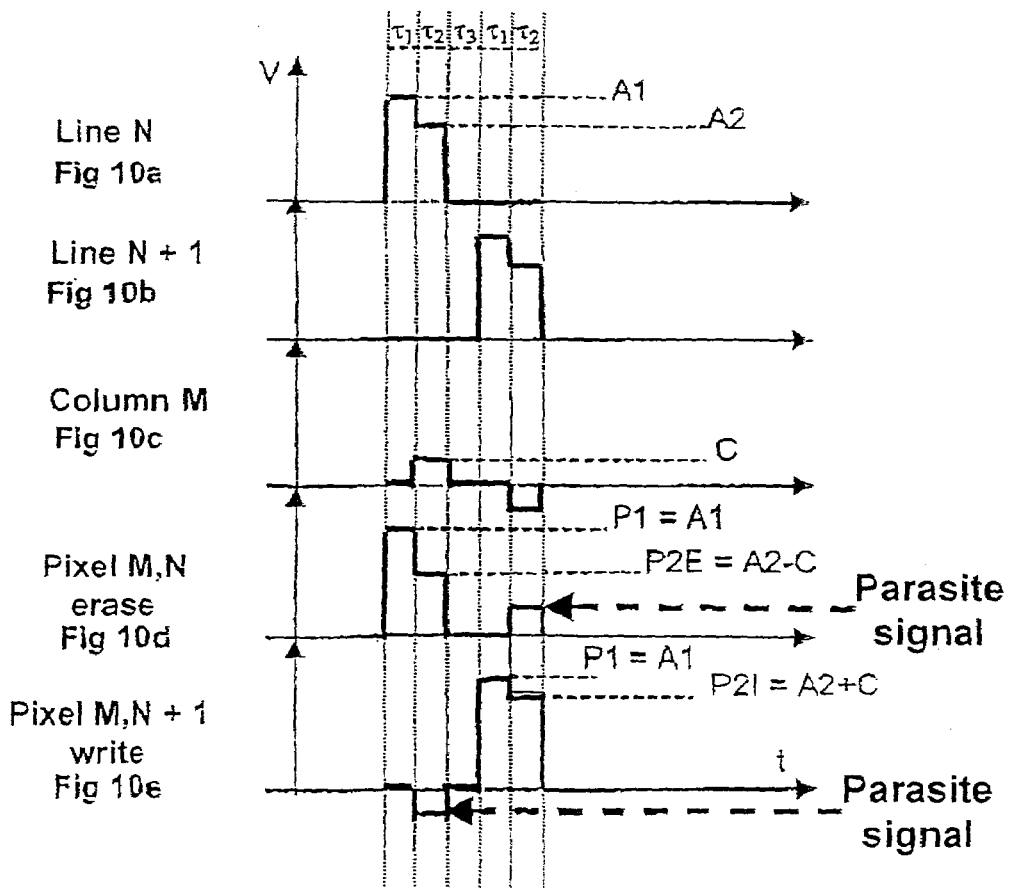

FIG. 10 shows the existence of parasite signals at the pixel terminals, known to come from the column signals picked up by the pixel when its line is not active.

Figure 11:
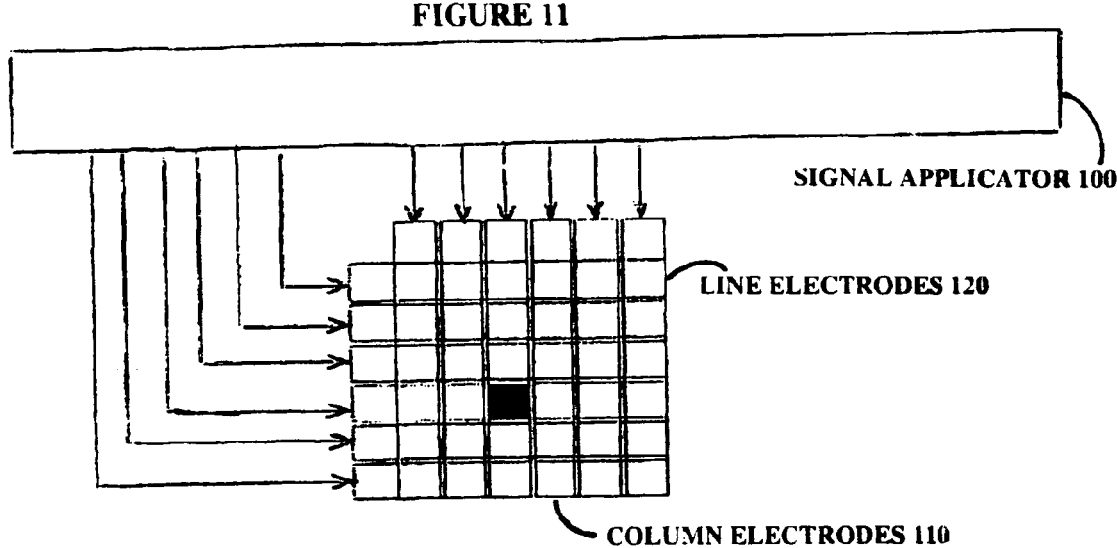
Figure 11:
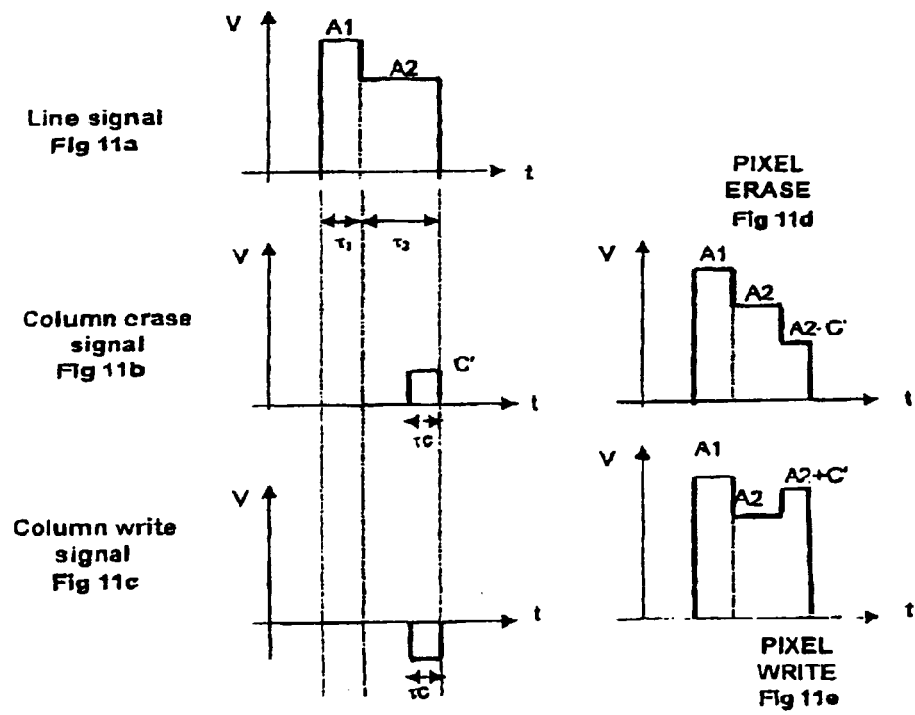

FIG. 11 shows a variant of a new form of signals and circuitry for generating the signals, according to the invention, proposed by the inventors. The column pulse lasts for a shorter time than the duration of the second plateau of the line signal and has a toothed form whose drop is synchronised with the drop of the second plateau of the line signal.

Figure 12:
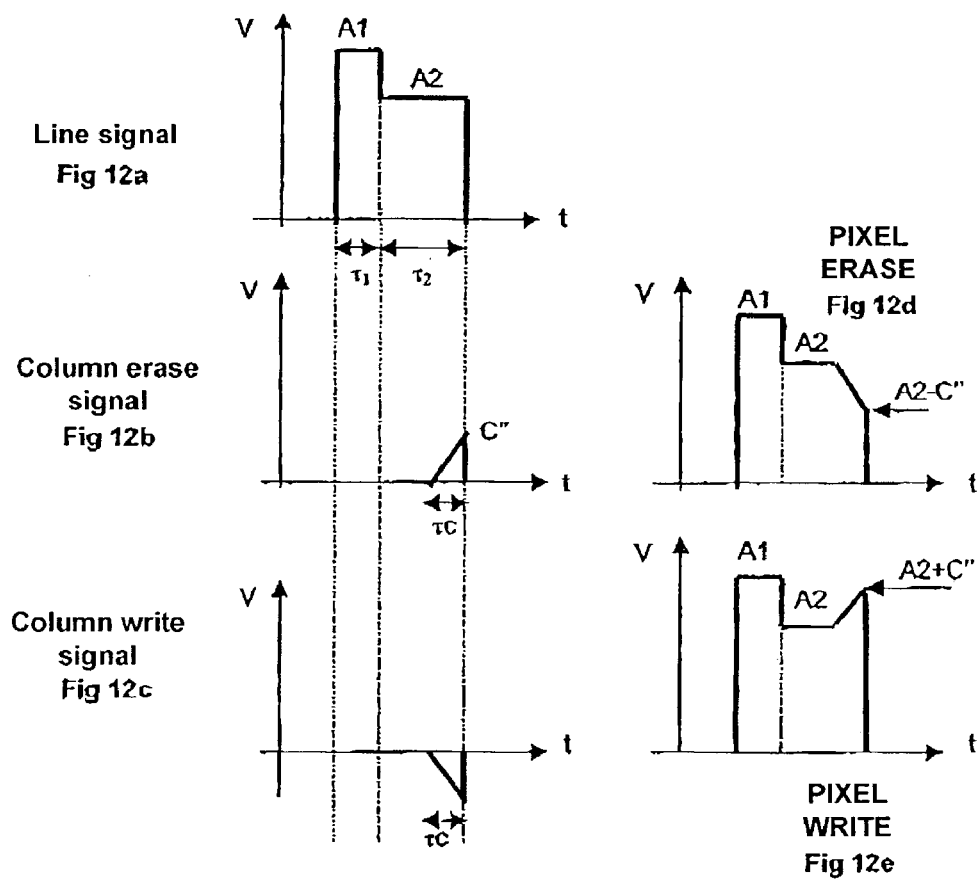

FIG. 12 shows another variant of the new form of signals, according to the invention, proposed by the inventors. The column pulse lasts for a shorter time than the duration of the second plateau of the line signal and has a slope form whose drop is synchronised with the drop of the second plateau of the line signal.

Figure 13:
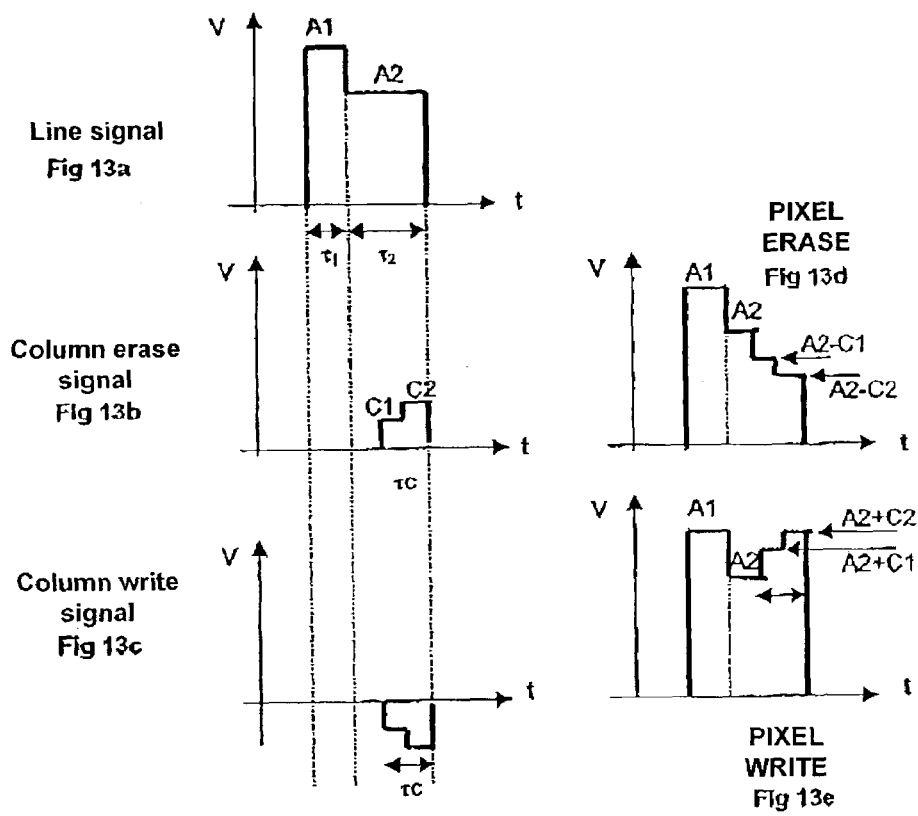

FIG. 13 shows another variant of the new form of signals, according to the invention, proposed by the inventors. The column pulse lasts for a shorter time than the duration of the second plateau of the line signal and has a double plateau form whose drop is synchronised with the drop of the second plateau of the line signal.

FIG. 14 describes, by way of example, the optical signal of a pixel in the white state when the lines apart from its line are addressed. This pixel is sensitive to the parasite column signals. Its optical transmission depends on the column pulse for applied. 3 cases are shown: a classic case (FIG. 14a), a tooth shaped column signal that is shorter than the second plateau of the line signal (FIG. 14b, in accordance with the invention), a column signal shorter than the second plateau of the line signal and with a slope form (FIG. 14c, in accordance with the invention). Between the first and the third case, we can observe an improvement in the optical transmission of the pixel, in conformity with the description of the invention.

This invention applies in particular to the BiNem devices described in document 1 using two textures, one of which is uniform or slightly twisted and in which the molecules are at least virtually parallel to one another, and the other which differs from the first by a twist of around +/−180°.

DETAILED DESCRIPTION OF THE INVENTION

Description of variant 1 according to the invention

The new column signal C' is applied for a time $\tau 0 < \tau 2$, keeping the amplitude of C' about the same as that of C, as an increase of C' would increase the rms value of the parasite voltage applied to the pixels, and a reduction in C' would no longer allow switching to take place due to the limit indicated by the electro-optical curve of FIG. 4. The signals corresponding to variant 1 are shown in FIGS. 11a–11e of FIG. 11. Above FIGS. 11a–11e, circuitry for generating the signals is shown. The circuitry includes six vertical columns of column electrodes 110, and six horizontal lines of line electrodes 120. A signal applicator 100 applies column signals to column electrodes 110 and line signals to line electrodes 120.

In this we find in FIG. 11a: a line signal, FIG. 11b: an erase column signal, FIG. 11c,; a write column signal, FIG. 11d: a pixel erase signal and FIG. 11$^e$: a pixel write signal.

The advantage gained from the reduction in the column signal time is twofold:

1) This variant minimises the parasite signal as the line pixels not selected only receive the voltage C' during the time $\tau_C$, which is close for example to $\tau_2/2$. The inventors have also experimented with symmetrisation of these signals by the methods described in FIGS. 7n, 8 and 9.

The Vrms voltage of the parasite signals becomes in this case:

$$\text{Vrms}^2 = \tau_C C'^2/(\tau_1+\tau_2)$$

In the previous numerical example and with for example $\tau_C = \tau_2/2$ and C'=C=2V we have $$\text{Vrms}^2 = \tau_2 C^2/2(\tau_1+\tau_2) = C^2/4 = 1 V^2$$

therefore $$\text{Vrms} = 1V > 0.65V$$

The rms value has been lowered with respect to the classic case but without however passing below the Fréederickzs voltage. The dither effect will therefore be reduced but not eliminated.

2) By shortening the column pulse, while synchronising its drop with that of the line pulse, the "slow drop" is achieved using three plateaux. With this method, in the case of erasing, the hydrodynamic flow of the liquid crystal is reduced compared to that obtained with a two plateau pulse. In fact, the maximum instantaneous voltage drop between each of the three plateaux is smaller than between two plateaux, with the same line voltage. This consequently further favours the switch to the U uniform texture. For writing, the hydrodynamic flow is not modified with respect to the two plateaux example, as the instantaneous voltage drop is identical. The inventors have shown that this method allows, without complicating the control electronics, to obtain switching between the two states even when the viscosity of the liquid crystal material increases a low temperatures.

The line signal illustrated in FIG. 11a includes a first sequence of duration $\tau_1$ and amplitude A1 followed by a second sequence of duration $\tau_2$ (greater than $\tau_1$) and of amplitude A2 (less than A1). The slopes where these two sequences rise and fall are virtually vertical.

The erase column signal illustrated in FIG. 11b includes a pulse of duration $\tau_C$ and amplitude C' of the same polarity as the line signal illustrated in FIG. 11a. The slopes where these two sequences rise and fall are virtually vertical. The duration $\tau_C$ is around half the duration of the duration $\tau_2$. The descending slope of the erase column signal is synchronised with the descending slope of the line signal.

The write column signal illustrated in FIG. 11c is distinguished from the erase column signal illustrated in FIG. 11b by an inversion of the polarity. Thus on FIG. 11c we can find a pulse of duration $\tau_C$ and amplitude C', with vertical rising and descending slopes, the descending slope being synchronised with the descending slope of the line signal.

The voltage present at the terminals of the pixel as part of a erase operation, illustrated in FIG. 11d, includes a series of three teeth with vertical rising and descending slopes. The first step of amplitude A1 lasts $\tau_1$. The second step of amplitude A2 lasts $\tau_2-\tau_C$. The third step of amplitude A2-C' lasts $\tau_C$.

The voltage present at the terminals of the pixel as part of a write operation, illustrated in FIG. 11e, also includes a series of three successive steps, with vertical rising and descending slopes: a first step of duration $\tau_1$ and amplitude A1, a second step of amplitude A2 and duration $\tau_2-\tau_C$, and a third step of amplitude A2+C' and duration $\tau_C$.

It can be noted however that in the case of erasing a pixel, the intermediate step has an amplitude between the initial amplitude A1, the strongest, and the final amplitude A2-C', the weakest, whereas in the case of a pixel being written, the intermediate amplitude A2 is smaller than the initial amplitude, which is the strongest, A1, and the final amplitude A2+C'.

Description of Variant 2 According to the Invention

The form of the column signal is modified so as to reduce its effective voltage with respect to that of a standard column signal composed of rectangular pulses. The duration of the column signal may also be reduced with respect to a classic $\tau_2$, in order to benefit from the advantages of variant 1.

EXAMPLE 1

By way of a first example, we will take a sloped type column signal. The amplitude of this signal increases linearly with time until it reaches a maximum peak voltage C", then is brutally brought back to zero synchronised with the end of the line pulse.

The maximum value of the column signal C" may be increased with respect to the classic value of C, which permits switching between the two textures (see electro-optical curve of FIG. 4).

An example of signals corresponding to example 1 of variant 2 is given in FIG. 12. Once again, on FIG. 12a we find: a line signal, FIG. 12b: an erase column signal, FIG. 12c: a write column signal, FIG. 12d: an erase pixel signal, and FIG. 12e: a write pixel signal. The column pulse has a duration of $\tau_C$ and the form of a slope of maximum C".

The Vrms voltage of the parasite signals becomes in this case:

$$Vrms2 = \tau_C C''^2/3(\tau_1+\tau_2)$$

In the previous numerical example and with for example $\tau_C=\tau_2/2$ and C"=C=2V we have:

$$Vrms2 = \tau_2 C''^2/6(\tau_1+\tau_2) = C''^2/12 = 0.33V$$

i.e.

$$Vrms = 0.57V < 0.65V$$

The rms value has been lowered with respect to the classic case and variant 1. Criterion 1 has now been verified and there is no longer any dither when the image is addressed.

The signal illustrated in FIG. 12a includes a sequence of duration $\tau_1$ and amplitude A1 followed by a second sequence of duration $\tau_2$ (greater than $\tau_1$) and amplitude A2 (smaller than A1). The slopes where these two sequences rise and fall are virtually vertical.

The erase column signal illustrated in FIG. 12b includes a pulse of duration $\tau_C$ with a linearly rising slope which reaches the amplitude C' and a vertical descending slope.

The write column signal illustrated in FIG. 12c is distinguished from the erase column signal illustrated in FIG. 12b by an inversion of polarity. We an thus see in FIG. 12c a pulse of duration $\tau_C$ with a linearly rising slope that reaches the amplitude C' and a vertically descending slope.

The voltage present at the terminals of the pixel being erased, as illustrated in FIG. 12d, has three successive sequences: a first sequence of amplitude A1 and duration $\tau_1$, a second sequence of amplitude A2 and duration $\tau_2-\tau_C$, and a third sequence with a progressively decreasing amplitude of duration $\tau_C$, passing from an initial amplitude A2 to a final amplitude A2-C'.

Once again, the A2 value for FIG. 12d is an intermediate value.

The voltage present at the terminals of the pixel being written also has three successive sequences: a first sequence A1 of amplitude A1 and duration $\tau_1$, a second sequence of amplitude A2 and duration $\tau_2-\tau_C$, and a third sequence with a progressively increasing amplitude of duration $\tau_C$, passing from an initial amplitude A2 to a higher value of A2+C'. Thus in the case of FIG. 12e, comparable with FIG. 11e, the A2 value is an intermediate value.

EXAMPLE 2

By way of a second example, we will take a rising column signal with two plateaux, C1 and C2, with respective duration of $\tau_{C1}$ and $\tau_{C2}$. An example of signals corresponding to example 2 of variant 2 is given in FIG. 13. Once again, we can see on FIG. 13a: a line signal, FIG. 13b: an erase column signal, FIG. 13c: a write column signal, FIG. 13d: an erase pixel signal and FIG. 13: a write pixel signal. The column pulse has duration of $\tau_C=\tau_{C1}+\tau_{C2}$ and the form of a double plateaux.

Experimental Results with the Two Variants

In order to demonstrate the pertinence of the invention, the optical transmission of a pixel of a BiNem screen during the addressing of an image was measured. Due to the arrangement of the polarisers, the uniform texture given in this case was the white optic state, and the texture written was the black state. When the line of the pixel is addressed, the pixel is changed to a uniform texture (white state) and then it is subjected to parasite column signals for the rest of the image addressing. The optical transmission will then drop to an intermediate value between the black and the white values. The optical response is measured for the three following cases:

classic:
toothed column signal–amplitude C–duration $\tau_C = \tau_2$
according to variant 1:
toothed column signal–amplitude C–duration $\tau_C = \tau_2/2$
according to variant 2–example 1:
slope column signal–amplitude max. C–duration $\tau_C = \tau_2/2$ The characteristics of the BiNem screen and the addressing signals are very close to the values given in the numerical example.

It can be observed in FIG. 14 that the optical transmission level is very disrupted (close to black) in this classic case (FIG. 14a). This case corresponds to a marked dither of the screen during its electrical addressing. In variant 1 according to the invention, (FIG. 14b), the optical state is less disrupted but remains grey. The dither is still visible. In variant 2 according to the invention (FIG. 14c), an optical state very close to white is measured. The optical state of the pixel measured is hardly disrupted by the parasite column signals.

CONCLUSION

In conclusion, the inventors present a method that allows the switching between the two states of the pixels of a bistable liquid crystal dot matrix passive screen switching by surface breakage to be controlled. The original signals proposed use a line signal with two plateaux, and a column signal that is retarded with respect to the start and ending exactly at the end of the second plateaux of the line signal and of varied form, either classic tooth shaped or for example a slope. This method allows either rapid drop signals, to permit the twisted state to be obtained, or a slow drop with three plateaux to obtain the uniform state, to be applied simultaneously to the screen pixels. On the one hand the invention reduces and in some cases even eliminates the parasitic effects when the image is changing and on the other hand makes switching easier by making the erase signal form closer to that of a slowly decreasing curve.

REFERENCES

Document 1: patent FR 2740894
Document 2: "Write and erase mechanism of surface controlled bistable nematic pixel" M. Giocondo, I Lelidis, I. Dozov, G. Durand.
Document 3: Alt. PM, Pleshko P. 1974, IEEE Trans Electron Devices ED-21, 146:55
Document 4: "Recent improvements of bistable Nematic displays switched by anchoring breaking, proceeding of SID 2001, 224 227".

The invention claimed is:

1. Process for addressing a bistable nematic liquid crystal dot matrix anchoring breakage screen having column electrodes and line electrodes, the process comprising:

applying, to the column electrodes, a column signal whose characteristics are adapted to reduce the mean quadratic voltage of parasite pixel pulses between the column electrodes and the line electrodes that are not selected, wherein the mean quadratic voltage is reduced to a value lower than the Fréederickzs voltage in order to reduce parasitic addressing optical effects, the screen using a first and a second stable textures, wherein the first texture is uniform or slightly twisted, and the molecules of the first texture are substantially parallel to one another, and the second texture differs from the first texture in that the second texture has a twist of around +/−180°; and applying, to the column electrodes, the column signal whose duration is shorter than the duration of the last plateau of a line pulse of the line electrodes.

2. Process of claim 1, wherein the duration of the column signal is around half the duration of the last plateau of the line pulse.

3. Process of claim 1, wherein the form n and/or the amplitude of the column signal is also adapted to reduce said mean quadratic voltage of the parasite pixel pulses.

4. Process of claim 1, wherein the end of the column signal is synchronised with the end of the line pulse.

5. Process of claim 1, wherein the column signal has a slope form.

6. Process of claim 5, wherein the column signal has a slope form which rises linearly until it reaches a maximum voltage, and is then brought to zero synchronously with the end of the line pulse.

7. Process of claim 1, wherein the column signal has a tooth shaped form.

8. Process of claim 1, wherein column signals applied to the column electrodes and line signals applied to the lines electrodes are adapted to define a nil mean value.

9. Process of claim 8, wherein a common voltage is added to working components of the line signals and the column signals so that the line signals and the column signals applied to a pixel have two successive sub-assemblies with opposing polarities.

10. Process of claim 8, characterised in that the polarity of the line signals and the column signals is inverted at each change of image.

11. Process of claim 8, characterised in that each line signal and each column signal include two successive sub-assemblies with identical configurations, but with opposing polarities.

12. Bistable nematic liquid crystal dot matrix anchoring breakage screen addressing device having column electrodes and line electrodes, the device comprising:

means for applying, to the column electrodes, a column signal whose parameters are adapted to reduce the mean quadratic voltage of parasite pixel pulses between the column electrodes and the lines electrodes that are not selected, wherein the mean quadratic voltage is reduced to a value lower than the Fréederickzs voltage in order to reduce parasitic addressing optical effects, the screen using a first and a second stable textures, wherein the first texture is uniform or slightly twisted, and the molecules of the first texture are all substantially parallel to one another, and the second texture differs from the first texture in that the second texture has a twist of around +/−180°; and means designed to apply, to the column electrodes, the column signal whose duration is shorter than the duration of the last plateau of a line pulse of the line electrodes.

13. Device of claim 12, wherein the column signal has a slope form.

14. Device of claim 13, wherein the column signal has a slope form which rises linearly until it reaches a maximum voltage, and is then brought to zero synchronously with the end of the line pulse.

15. Device of claim 12, wherein the column signal has a tooth shaped form.

16. Device of claim 12, wherein the form and/or the amplitude of the column signal is also adapted to reduce said mean quadratic voltage of the parasite pixel pulses.

17. Device of claim 12, wherein the end of the column signal is synchronised with the end of the line pulse.

18. Device of claim 12, wherein the duration of the column signal is around half the duration of the last plateau of the line pulse.

19. Device of claim 12, wherein column signals applied to the column electrodes and line signals applied to the line electrodes are adapted to define a nil mean value of a pixel signal.

20. Device of claim 19, characterised in that each line signal and each column signal include two successive sub-assemblies with identical configurations, but with opposing polarities.

21. Device of claim 19, characterised in that the polarity of the line signals and the column signals is inverted at each change of image.

22. Device of claim 19, wherein a common voltage in added to working components of the line signals and the column signals so that the line signals and the column signals applied to a pixel have two successive sub-assemblies with opposing polarities.

* * * * *